United States Patent
McDonald et al.

(10) Patent No.: US 7,539,479 B2
(45) Date of Patent: May 26, 2009

(54) USE OF T1 FACILITY DATA LINK TO TRANSPORT STATUS AND CONFIGURATION DATA PACKETS FOR LOOP-POWERED T1 RADIO

(75) Inventors: Jonathan Brock McDonald, New Market, AL (US); Eric Malcolm Rives, Hampton Cove, AL (US)

(73) Assignee: Adtran, Inc., Huntsville, AL (US)

( * ) Notice: Subject to any disclaimer, the term of this patent is extended or adjusted under 35 U.S.C. 154(b) by 1409 days.

(21) Appl. No.: 10/462,921

(22) Filed: Jun. 17, 2003

(65) Prior Publication Data

US 2004/0014493 A1    Jan. 22, 2004

Related U.S. Application Data

(63) Continuation-in-part of application No. 09/771,370, filed on Jan. 26, 2001, now Pat. No. 6,907,267.

(51) Int. Cl.
*H04M 9/00*    (2006.01)

(52) U.S. Cl. ............... 455/401; 455/434; 455/561; 370/524

(58) Field of Classification Search ............... 455/414, 455/415, 560, 561, 515, 458; 370/465, 336, 370/524, 522, 523

See application file for complete search history.

(56) References Cited

U.S. PATENT DOCUMENTS

| | | | | |
|---|---|---|---|---|
| 5,642,412 | A | 6/1997 | Reymond | 379/348 |
| 5,940,403 | A * | 8/1999 | Williams | 370/465 |
| 6,112,086 | A * | 8/2000 | Wala | 455/434 |
| 6,115,603 | A * | 9/2000 | Baird et al. | 455/401 |
| 6,118,797 | A * | 9/2000 | O'Shea | 370/524 |
| 6,584,117 | B1 * | 6/2003 | Toth | 379/93.06 |
| 6,640,084 | B2 * | 10/2003 | Pande et al. | 455/3.01 |
| 2005/0047432 | A1 * | 3/2005 | Gerlach et al. | 370/463 |

* cited by examiner

*Primary Examiner*—Lana N Le
(74) *Attorney, Agent, or Firm*—Allen, Dyer, Doppelt Milbrath & Gilchrist, P.A.

(57) ABSTRACT

In order to configure and monitor the operation of a span-powered T1 radio, use is made of the out-of-band facility data link channel that is available within an extended superframe of the T1 digital data stream transported between an indoor carrier services unit and the T1 framer of the radio. The facility data link channel is employed to transport packetized configuration and status information between the indoor carrier service unit and the span-powered T1 radio.

18 Claims, 3 Drawing Sheets

USE OF T1 FACILITY DATA LINK TO TRANSPORT STATUS AND CONFIGURATION DATA PACKETS FOR LOOP-POWERED T1 RADIO

CROSS-REFERENCE TO RELATED APPLICATION

The present application is a continuation-in-part of U.S. patent application Ser. No. 09/771,370, filed Jan. 26, 2001, now U.S. Pat. No. 6,907,267, by E. Rives et al, entitled: "Loop-Powered T1 Radio" (hereinafter referred to as the '370 application), assigned to the assignee of the present application and the disclosure of which is incorporated herein.

FIELD OF THE INVENTION

The present invention relates in general to telecommunication systems and subsystems therefor, and is particularly directed to an out-of-band facility data link (FDL)-based methodology for conveying status and configuration data packets with respect to a loop-powered digital radio, that is coupled to and powered by a digital communication signal-transporting wireline (such as a powered T1 wireline).

BACKGROUND OF THE INVENTION

As described in the above-referenced '370 application, legacy (copper) wirelines, which have historically served as a principal information transport backbone for a variety of telecommunication networks, have recently given way to or have been augmented by other signal transport technologies, particularly those capable of relatively wideband service. These include coaxial cable, fiber optic and wireless (e.g., radio) systems, the latter being especially flexible in that they are not limited to serving only customers having access to existing or readily installable cable plants.

In addition, there are many environments, such as, but not limited to portable data terminal equipments (DTEs), where a digital wireless subsystem may be the only practical means of communication. In order to provide digital communication service, the wireless (radio) subsystem must not only be interfaced with an existing digital network's infrastructure, which typically includes legacy wireline links coupled to an incumbent local exchange carrier (ILEC), such as a Bell operating company (RBOC) site, but the digital radio site which provides access to the wireline must also provide a source of electrical power. In many environments, the required power supply is either not readily available, or its cost of installation is prohibitively expensive.

In accordance with the invention disclosed in the '370 application, the lack of, or unacceptably high cost of installing a power supply for a wireless communication equipment, that is intended to wirelessly connect existing digital communication network equipment with a remote site, is successfully remedied by a span or loop-powered digital T1 radio, which is installable at a location (such as a rooftop or pole site) that does not readily afford access to a dedicated power supply for the radio.

For this purpose, as diagrammatically illustrated in FIG. 1, the loop-powered radio of the invention disclosed in the '370 application includes a line interface circuit 10 that is coupled to tip (T) and ring (R) wirelines of respective transmit and receive segments 21 and 22 of a powered T1 wireline link 20, to which T1 communication equipment, such as an indoor carrier service unit (CSU) 30, is coupled. The line interface circuit 10 contains coupling transformer circuitry that extracts (+/−48 V) DC voltages of the powered tip and ring wireline pairs for application to a DC-DC voltage converter power supply 40, and also interfaces digital payload data transported by the powered T1 link to a T1 framer chip 50. The DC-DC converter scales down the +/−48 VDC voltages supplied by the span to voltages (e.g., +5 V and +12 V) used to power the digital signaling and transceiver electronics of the radio.

The transceiver section 55 of the radio is preferably of standard (e.g. 'blue tooth'-compatible) design and includes a transmitter unit 60, that is coupled to receive the digital baseband signals from T1 framer chip 50 and perform modulation and up-conversion to an FCC-conformal band RF signal (e.g., 2.4 GHz or 5.8 GHz spread spectrum signal). The radio's receiver unit 70 performs down-conversion and demodulation of the RF signal to baseband for application of the 1.536 Kbps payload data to the T1 framer chip 50. By extracting electrical power from the line 20 and converting the extracted power to voltages for operating its transceiver and signal processing components, the invention disclosed in the '370 application effectively eliminates having to locate the radio where a separate dedicated power supply is either available or can be readily installed.

Now although the loop-power extraction functionality of the radio of the '370 application makes it possible to place the radio in a variety of not readily accessible locations, it also means that once so installed, the radio does not readily lend itself to changing and/or monitoring its configuration and operational parameters.

SUMMARY OF THE INVENTION

In accordance with the present invention, this problem is successfully addressed by taking advantage of the 4 kbps out-of-band FDL channel that is available within an extended superframe of the T1 digital data stream transported between the indoor carrier services unit and the T1 framer of the radio. This FDL channel has been traditionally used as an embedded operations channel (EOC) between a pair of T1 data service units (DSUs). In accordance with the invention, the FDL channel is employed to transport auxiliary information, in particular configuration and status information, between an indoor carrier service unit (CSU) and a span-powered radio frequency (RF) transceiver unit.

Within a respective sourcing site T1 framer, auxiliary channel data supplied is assembled on a byte basis by a transmit packet finite state machine and forwarded to a universal synchronous receiver transmitter buffer for insertion as the FDL bit for transmission over the T1 data stream-transporting cable plant. At the receiver T1 framer site, the FDL channel bits are received by a universal synchronous receiver transmitter buffer and assembled into byte format for application to a receive packet finite state machine and delivery to a configuration/status sink.

The packet structure employed by the invention contains an initial, start-of-header byte which is followed by a start-of-text byte. These two bytes have pre-defined values, which the receive finite state machine can search for and synchronize to, in order to determine packet frame alignment. Following these first two bytes is an NCS byte, which specifies the Number of Configuration/Status information bytes being conveyed in the packet. The NCS byte is followed by a byte string containing the actual configuration/status (CS) bytes.

The CS byte string is terminated by a pair of pre-initialized checksum bytes. When the FDL channel is not occupied with packets, an idle channel pattern (such as $7E_{HEX}$) is continuously transmitted, and provides an additional means of packet synchronization in the receive packet finite state machine.

DETAILED DESCRIPTION

Before describing in detail the new and improved FDL-based, byte-oriented packet transport methodology for conveying status and configuration information packets with respect to a loop-powered T1 radio in accordance with the invention, it should be observed that the present invention resides primarily in modular arrangements of conventional communication circuits, and operational control software therefor. In terms of a practical implementation that facilitates their manufacture and installation at a communication site having access to an existing digital signal transporting wireline cable plant, these modular arrangements may be readily configured using field programmable gate array (FPGA) and application specific integrated circuit (ASIC) chip sets, and commercially available devices and components. As a consequence, the configurations of these arrangements and the manner in which they may be interfaced with an existing digital signal T1 wireline link have been illustrated in readily understandable block diagram format, which shows only those specific details that are pertinent to the present invention, so as not to obscure the disclosure with details that are readily apparent to one skilled in the art having the benefit of present description.

To facilitate an appreciation of the FDL-based functionality of the invention, the basic structure of a T1 digital data stream, which has a nominal data rate of 1.544 Mbps and a frame length of 193 bits, will be briefly reviewed. Within the 1.544 Mbps bandwidth there is a 1.536 Mbps payload bit stream and an 8 Kbps framing and overhead bit (F-bit) stream. The payload bit stream accounts for 192 bits of a T1 frame, while the F-bit stream accounts for the remaining or 193rd bit of a T1 frame. As described in the American National Standards Institute (ANSI) document ANSI T1.107-1995, an Extended Super Frame (ESF) may be formed by logically concatenating twenty-four T1 frames together. Within an ESF frame, prescribed F-bit positions are specified as Facility Data Link (FDL) or M bits. The M-bit positions account for 12 of the 24 total F-bit positions within an ESF frame, which results in an FDL bit rate of 4 Kbps.

Pursuant to the invention, this out-of-band FDL channel is used to send auxiliary information, such as configuration and status information, as an adjunct to 1.536 Mbps payload portion of the T1 data stream that is transported by the system detailed in the '370 application. Traditionally, the FDL channel has been used as an embedded operations channel (EOC) between a pair of T1 data service units (DSUs). In accordance with the invention, the FDL channel is employed to transport auxiliary information between an indoor carrier service unit (CSU) and a span-powered radio frequency (RF) transceiver unit.

Figure 1:
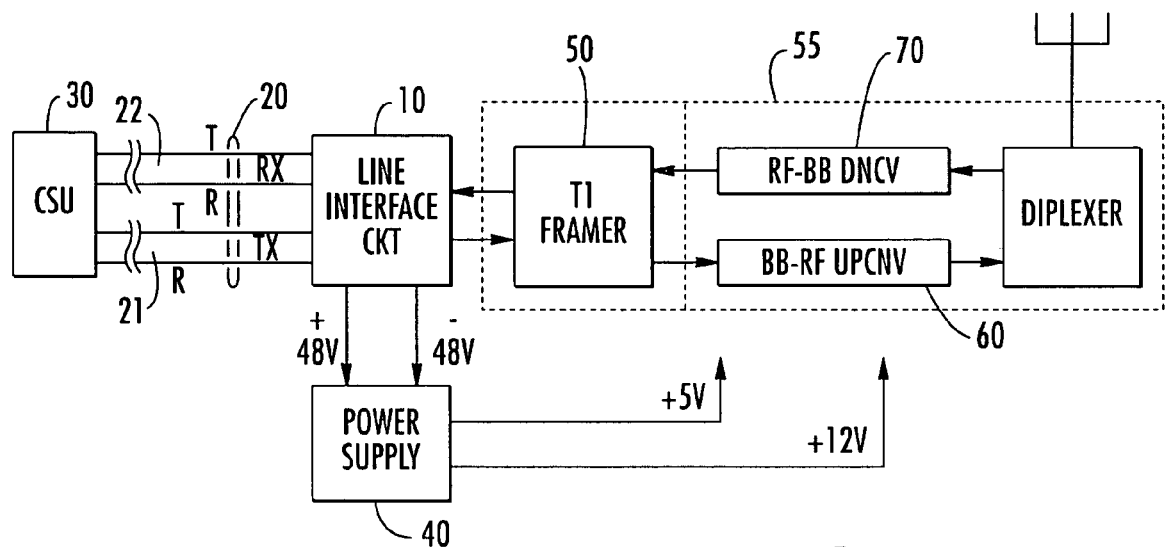
FIG. 1 diagrammatically illustrates the architecture of a wireline-powered T1 radio as disclosed in the above-referenced '370 application.
Figure 2:
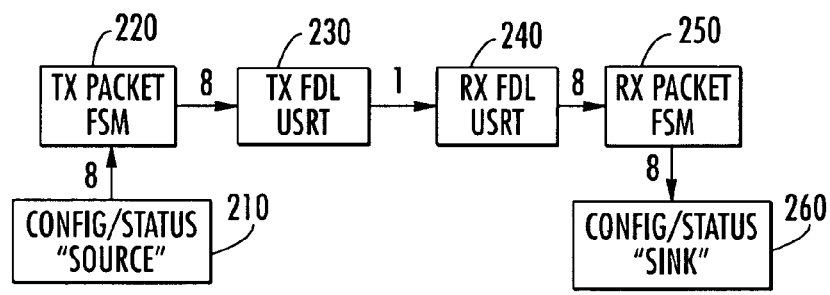
FIG. 2 is a functional diagram of the FDL channel transport mechanism of the invention between relatively remote T1 framing units, one of which is located in an indoor carrier service unit and the other of which corresponds to the T1 framer associated with the span-powered radio transceiver.

FIG. 2 is a functional diagram of the FDL channel transport mechanism between relatively remote T1 framing units, one of which is located in the indoor carrier service unit 30 of FIG. 1 and the other of which corresponds to the T1 framer associated with the radio transceiver portion of the system. As shown in FIG. 2, auxiliary data to be transmitted over the FDL channel from a 'source' 210 comprises configuration/status related data which, for example, may correspond to a query or command instruction from the indoor carrier service unit requesting a status report from the span-powered radio.

Within the T1 framer, the auxiliary channel data supplied by the source 210 is assembled on a byte basis by a transmit packet finite state machine (FSM) 220 and forwarded to a universal synchronous receiver transmitter (USRT) buffer 230 for insertion as the FDL bit for transmission over the T1 data stream-transporting cable plant 20. At the receiver site, as the FDL channel bits are received by a USRT buffer 240 they are assembled into byte format for application to a receive packet FSM 250 and delivery to a configuration/status 'sink' 260.

Figure 3:
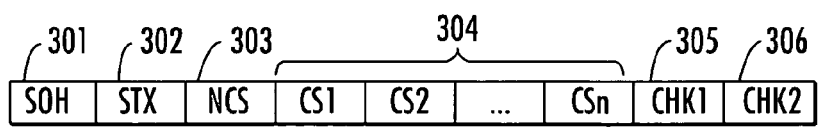
FIG. 3 shows the packet structure used by the invention to convey auxiliary information over a 4 Kpbs FDL channel.

FIG. 3 shows the packet structure used by the present invention to convey auxiliary information over the 4 Kpbs FDL channel. Each packet contains an initial, start-of-header (SOH) byte 301, which is followed by a start-of-text (STX) byte 302. These two bytes are predefined eight bit values, which the receive FSM can search for and synchronize to, in order to determine packet frame alignment. The next byte 303 identifies the number (n) of configuration/status (NCS) information bytes being conveyed in the packet and is variable. The NCS byte 303 is followed by a byte string 304 made up of configuration/status bytes CS1-CSn.

The byte string 304 is terminated by a pair of pre-initialized checksum bytes 305 and 306, with the first checksum byte 305 being the least significant checksum byte, and the second checksum byte 306 being the most significant checksum byte. This sixteen bit value is calculated across the entire packet, and provides the receiver with the ability to validate or invalidate a received packet, in the event that bit errors occur on the T1 channel. When the FDL channel is not occupied with packet bits as described above, an idle channel pattern (such as $7E_{HEX}$) is inserted by the transmit FDL USRT 230. This pattern provides an additional means of packet synchronization in the receive packet FSM 250.

Figure 4:
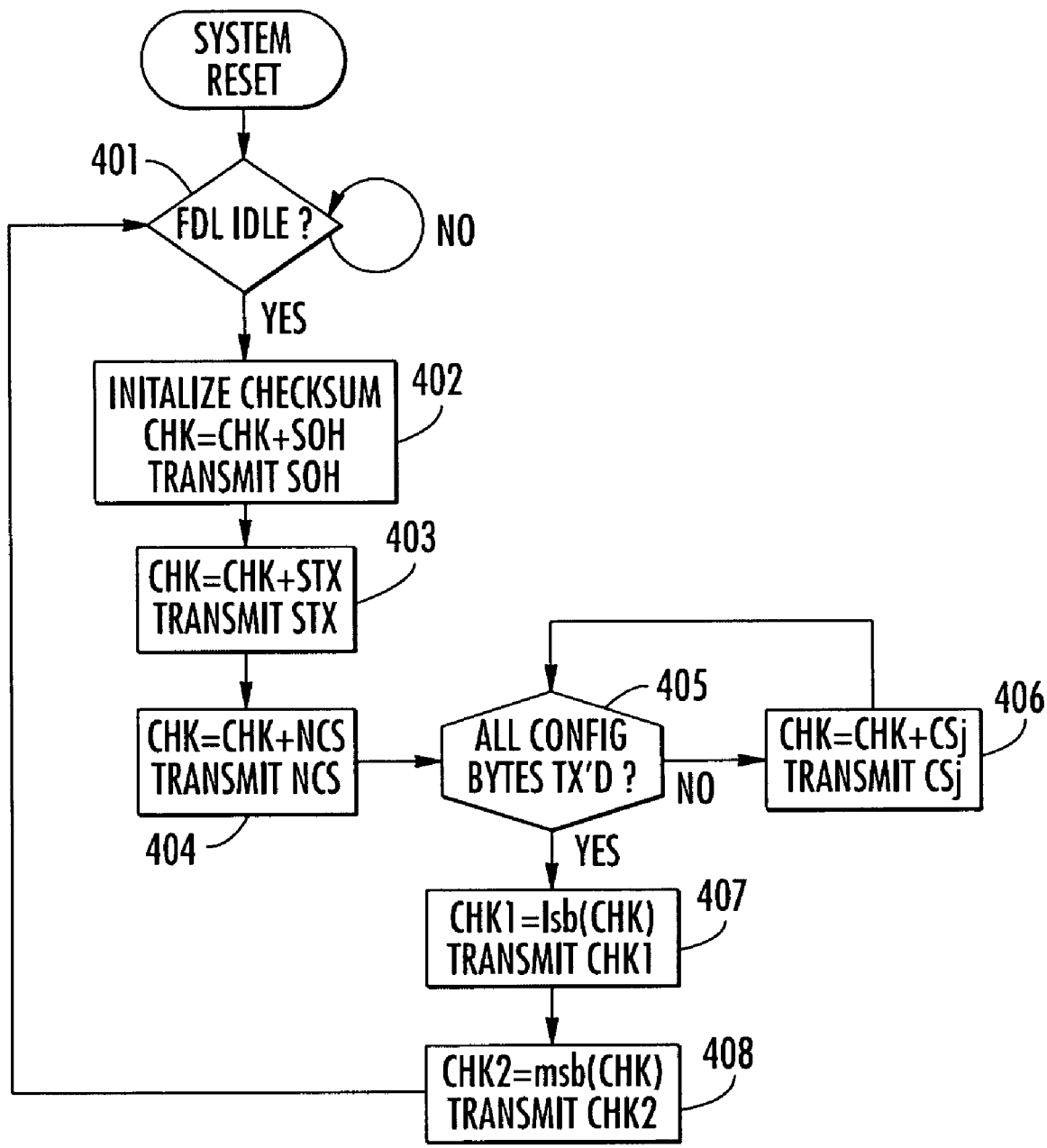
FIG. 4 is a flowchart of the transmit packet finite state machine of the functional flow diagram of FIG. 2.

FIG. 4 is a flowchart of the transmit packet FSM 220 of the functional flow diagram of FIG. 2. A hand-shake mechanism in the form of a maskable interrupt is carried out between the TX packet FSM 220 and the TX FDL USRT 230 in order to indicate that the USRT is ready for the next byte of the packet, and also serves to step the FSM from one state to the next. Once the FSM has been informed by the USRT that the FDL channel has been placed in the idle state (the answer to query step 401 is YES), packet transmission commences. In step 402, the sixteen bit checksum is initialized, and then accumulated within the SOH byte 301 of FIG. 3. The SOH byte is then sent to the USRT transmit buffer. At step 403, the checksum accumulated within the STX byte 302 and the STX byte is sent to the USRT transmit buffer. Next, in step 404, the checksum accumulated within the NCS byte 303 and the NCS byte is sent to the USRT transmit buffer.

Following the NCS byte, in query step 405 a determination is made as to whether all of the configuration/status bytes have been transmitted. If the answer to query step 405 is NO, the configuration/status bytes are accumulated with the checksum and sent to the USRT transmitter on a byte-by-byte basis in step 406, as the USRT transmitter indicates that it is ready for the next byte. Eventually, the last or nth configuration/status byte will have been transmitted, whereupon the answer to query step 405 will be YES, and the routine transitions to steps 407 and 408, which sequentially transmit the least significant byte and the most significant byte of the sixteen bit checksum. Upon completing step 408, the routine returns to idle query step 401.

Figure 5:
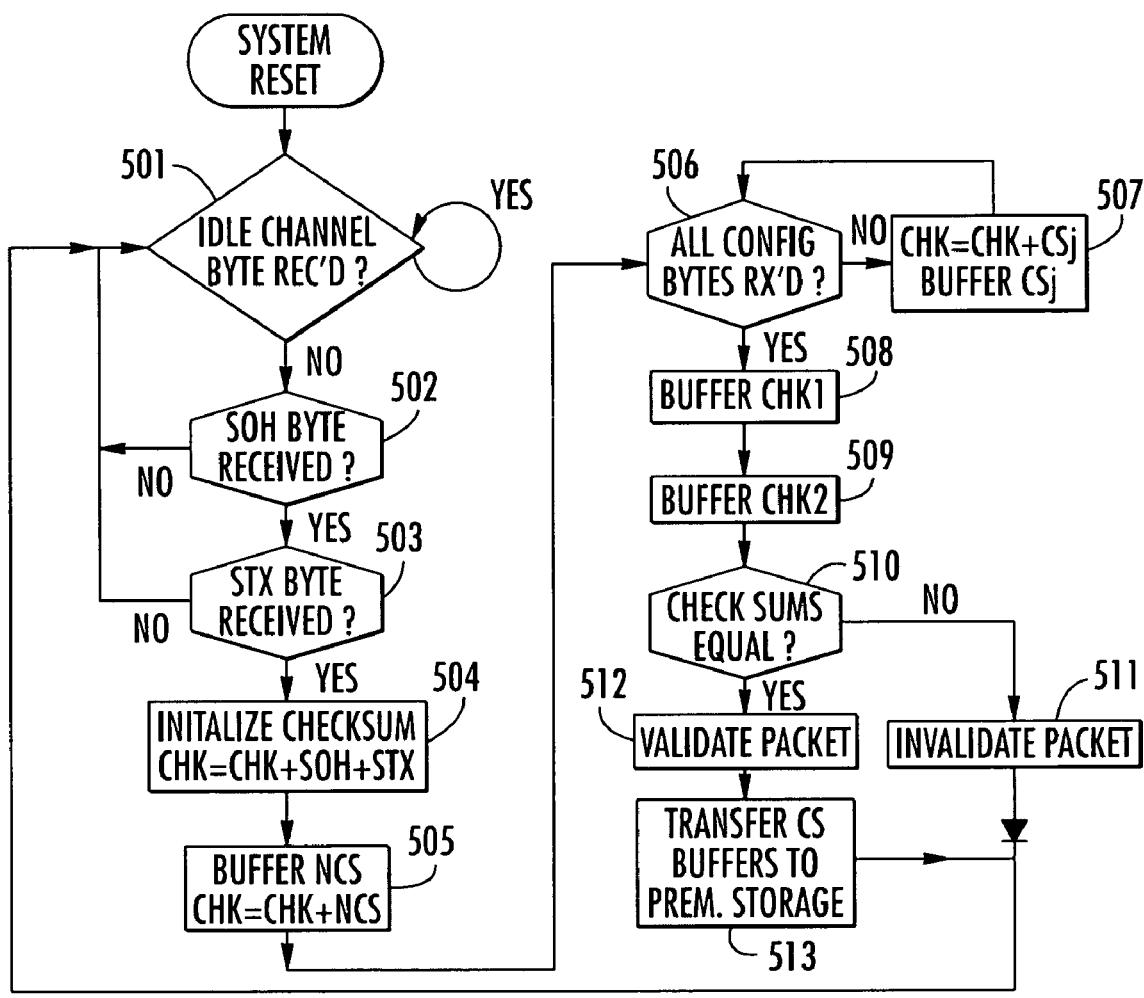
FIG. 5 is a flowchart of the receive packet finite state machine of the functional flow diagram of FIG. 2.

FIG. 5 is a flowchart of the receive packet FSM 250 of the functional flow diagram of FIG. 2. After system reset, the receive packet FSM 250 begins a search in query step 501 for the beginning of a transmitted packet. To this end, the routine looks for the absence of idle bytes being received by the receive FDL USRT 240. As long as idle bytes are being received by the receive FDL USRT 240, the answer to query step 501 is YES, and the routine remains in an idle loop. Eventually, when idle bytes are no longer being received (the answer to query step 501 is NO), the routine transitions to query step 502 to determine whether an SOH byte has been received. If the answer to query step 502 is NO, the routine returns to query step 501. Once a start-of-header byte has been received (the answer to query step 502 is YES), the routine transitions to query step 503 to determine whether the next successive byte—the STX byte—has been received. If not (the answer to query step 503 is NO), the routine returns to query step 501. Once a start-of-text byte has been received (the answer to query step 503 is YES), the routine transitions to step 504.

Once both the SOH and STX bytes have been received, then in step 504, the sixteen bit received checksum is initialized, and accumulated with the SOH byte and the STX byte. Next, in step 505, the value of the NCS byte is buffered and accumulated with the checksum. Following the NCS byte, a determination is made in query step 506 whether all of the configuration/status bytes have been received. If not (the answer to query step 506 is NO), the configuration/status bytes are accumulated with the checksum and buffered on a byte-by-byte basis in step 507. Eventually, the last or nth configuration/status byte will have been received, whereupon the answer to query step 506 is YES, and the routine transitions to steps 508 and 509, which respectively buffer the least significant byte and the most significant byte of the sixteen bit checksum.

Next, in query step 510, a comparison is made between the received checksum bytes and the calculated checksums. If the computed checksum values as calculated by received packet FSM 250 do not match the checksum received in the packet, the entire packet is invalidated in step 511, and the routine loops back to query step 501. However, if the computed checksum values as calculated by received packet FSM 250 match the checksum received in the packet (the answer to query step 510 is YES), the packet is validated in step 512, and the configuration/status bytes are transferred from temporary buffers to permanent storage in step 513. The routine loops back to query step 501.

As will be appreciated from the foregoing description, the need to configure and monitor the operation of a span-powered T1 radio of the type described in the above-referenced '370 application, the remotely installed location of which may not readily lend itself to changing and/or monitoring its configuration and operational parameters, is successfully addressed in accordance with the invention by taking advantage of the out-of-band facility data link channel that is available within an extended superframe of the T1 digital data stream transported between an indoor carrier services unit and the T1 framer of the radio. In accordance with the invention, this facility data link channel is employed to transport configuration and status information between the indoor carrier service unit and the span-powered radio.

While we have shown and described an embodiment in accordance with the present invention, it is to be understood that the same is not limited thereto, but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. For use with a wireless transceiver coupled to and powered by a powered wireline communication link, and being configured to wirelessly transmit and receive RF energy containing digital telecommunication signals transported over said powered wireline communication link, a method of interfacing auxiliary information with respect to said wireless transceiver comprising the steps of:
   (a) providing an out-of-band communication channel within a portion of a band employed for transport of said digital telecommunication signals over said powered wireline communication link;
   (b) at a site remote with respect to said wireless transceiver, controllably inserting first auxiliary information within said out-of-band communication channel conveyed over said powered wireline communication link to said wireless transceiver; and
   (c) at said wireless transceiver, controllably extracting said first auxiliary information from said out-of-band communication channel conveyed over said powered wireline communication link to said wireless transceiver, and controllably inserting second auxiliary information into said out-of-band communication channel for transport over said powered wireline communication link from said wireless transceiver to a digital communication link located at said site remote with respect to said wireline transceiver.

2. The method according to claim 1, wherein said out-of-band communication channel comprises a facility data link communication channel.

3. The method according to claim 1, wherein said first auxiliary information is representative of a configuration parameter of said wireless transceiver.

4. The method according to claim 1, wherein said second auxiliary information is representative of an operational status parameter of said wireless transceiver.

5. The method according to claim 4, wherein said first auxiliary information is representative of a configuration parameter of said wireless transceiver.

6. The method according to claim 5, wherein said first and second auxiliary information are packetized in a facility data link communication channel.

7. The method according to claim 1, wherein said wireless transceiver comprises a digital radio that is operative to interface T1 rate digital telecommunication signals with said powered wireline communication link, and to wirelessly transmit and receive RF energy containing said T1 rate digital telecommunication signals.

8. The method according to claim 1, wherein said wireless transceiver includes:
   a line interface coupled to said powered wireline communication link, and being operative to extract power therefrom and interface digital telecommunication signals transported thereover;

a radio frequency (RF) transceiver, coupled to said line interface and being configured to wirelessly transmit and receive RF energy containing said digital telecommunication signals; and a DC-DC voltage converter coupled to said line interface and being operative to convert power extracted thereby to voltages necessary to operate said RF transceiver.

9. The method according to claim 8, wherein said digital communication signals comprise T1 digital communication signals, said line interface includes a T1 framer, and wherein said RF transceiver includes a transmitter unit that is configured to perform modulation and up-conversion to RF of baseband T1 digital communication signals provided by said T1 framer, and a receiver unit that is configured to perform RF to baseband down-conversion and demodulation of RF energy received thereby and containing T1 digital communication signals for application to said T1 framer.

10. For use with a wireless transceiver coupled to and powered by a powered wireline communication link, and being configured to wirelessly transmit and receive RF energy containing digital telecommunication signals transported over said powered wireline communication link, a mechanism for interfacing auxiliary information with respect to said wireless transceiver comprising:

an out-of-band communication channel within a portion of a band employed for transport of said digital telecommunication signals over said powered wireline communication link;

at a site remote with respect to said wireless transceiver, a first digital communication device that is operative to controllably insert first auxiliary information within said out-of-band communication channel conveyed over said powered wireline communication link to said wireless transceiver; and at said wireless transceiver, a second digital communication device that is operative to controllably extract said first auxiliary information from said out-of-band communication channel conveyed over said powered wireline communication link to said wireless transceiver, wherein said second digital communication device is operative to controllably insert second auxiliary information into said out-of-band communication channel for transport over said powered wireline communication link from said wireless transceiver to said first digital communication device located at said site remote with respect to said wireless transceiver.

11. The mechanism according to claim 10, wherein said out-of-band communication channel comprises a facility data link communication channel.

12. The mechanism according to claim 10, wherein said first auxiliary information is representative of a configuration parameter of said wireless transceiver.

13. The mechanism according to claim 10, wherein said second auxiliary information is representative of an operational status parameter of said wireless transceiver.

14. The mechanism according to claim 13, wherein said first auxiliary information is representative of a configuration parameter of said wireless transceiver.

15. The mechanism according to claim 14, wherein said first and second auxiliary information are packetized in a facility data link communication channel.

16. The mechanism according to claim 10, wherein said wireless transceiver comprises a digital radio that is operative to interface T1 rate digital telecommunication signals with said powered wireline communication link, and to wirelessly transmit and receive RF energy containing said T1 rate digital telecommunication signals.

17. The mechanism according to claim 10, wherein said wireless transceiver includes:

a line interface coupled to said powered wireline communication link, and being operative to extract power therefrom and interface digital telecommunication signals transported thereover;

a radio frequency (RF) transceiver, coupled to said line interface and being configured to wirelessly transmit and receive RF energy containing said digital telecommunication signals; and a DC-DC voltage converter coupled to said line interface and being operative to convert power extracted thereby to voltages necessary to operate said RF transceiver.

18. For use with a T1 radio that is coupled to and is powered by a powered wireline communication link, and being configured to transmit and receive RF energy containing T1 digital data telecommunication signals transported over said powered wireline communication link, a method of interfacing configuration/status information with respect to said T1 radio comprising the steps of:

(a) providing an out-of-band facility data link communication channel within a portion of a band employed for transport of said T1 digital data telecommunication signals over said powered wireline communication link;

(b) at a digital data telecommunication site remote with respect to said T1 radio, controllably inserting packetized configuration/status information within said out-of-band facility data link communication channel that is conveyed over said powered wireline communication link to said T1 radio;

(c) at said T1 radio, controllably extracting said packetized configuration/status information from said out-of-band facility data link communication channel conveyed over said powered wireline communication link to said T1 radio; and (d) at said T1 radio, controllably inserting packetized configuration/status information into said out-of-band facility data link communication channel for transport over said powered wireline communication link from said T1 radio to a digital communication unit located at said digital data telecommunication site remote with respect to said T1 radio and controllably inserting second auxiliary information into said out-of-band facility data link communication channel for transport over said powered wireline communication link to a digital communication link located at a site remote with respect to the T1 radio.

* * * * *